(12) United States Patent
Zhang et al.

(10) Patent No.: US 9,569,047 B2
(45) Date of Patent: Feb. 14, 2017

(54) DISPLAY DEVICE AND METHOD FOR PREPARING THE SAME

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Tian Zhang, Beijing (CN); Haodi Liu, Beijing (CN); Fan Li, Beijing (CN); Yun Qiu, Beijing (CN)

(73) Assignees: BOE TECHNOLOGY GROUP CO., LTD. (CN); CHENGDU BOE OPTOELECTRONICS TECHNOLOGY CO., LTD. (CN)

( * ) Notice: Subject to any disclaimer, the term of this patent is extended or adjusted under 35 U.S.C. 154(b) by 24 days.

(21) Appl. No.: 14/416,461

(22) PCT Filed: May 21, 2014

(86) PCT No.: PCT/CN2014/077981
§ 371 (c)(1),
(2) Date: Jan. 22, 2015

(87) PCT Pub. No.: WO2015/100918
PCT Pub. Date: Jul. 9, 2015

(65) Prior Publication Data
US 2015/0185910 A1 Jul. 2, 2015

(30) Foreign Application Priority Data
Dec. 31, 2013 (CN) .......................... 2013 1 0750611

(51) Int. Cl.
*G06F 3/044* (2006.01)
*G02F 1/1333* (2006.01)
(Continued)

(52) U.S. Cl.
CPC ................. *G06F 3/044* (2013.01); *G02B 5/18* (2013.01); *G02B 27/22* (2013.01); *G02B 27/26* (2013.01);
(Continued)

(58) Field of Classification Search
None
See application file for complete search history.

(56) References Cited

U.S. PATENT DOCUMENTS

2012/0019733 A1* 1/2012 Kim .................... G02B 27/2214
349/15
2013/0271388 A1* 10/2013 Chu ....................... G06F 3/0412
345/173

FOREIGN PATENT DOCUMENTS

CN          102692748 A     9/2012
CN          102707514 A     10/2012
(Continued)

OTHER PUBLICATIONS

Office Action in Chinese Patent Application No. 201310750611.3, dated Oct. 9, 2015.
(Continued)

*Primary Examiner* — Kenneth B Lee, Jr.
(74) *Attorney, Agent, or Firm* — BakerHostetler, LLP (57) ABSTRACT

The present disclosure relates to the field of display technology and discloses a display device and a method for preparing the same. The display device includes a 3D grating and a touch detection unit. The 3D grating includes a base substrate arranged opposite to a display side of display panel, and a grating structure of the 3D grating and the touch detection unit are formed between the base substrate and the display panel.

20 Claims, 2 Drawing Sheets

(51) Int. Cl.
   *G02B 27/22*   (2006.01)
   *G06F 3/041*   (2006.01)
   *G02B 5/18*    (2006.01)
   *G02B 27/26*   (2006.01)
(52) U.S. Cl.
   CPC ......... *G02F 1/13338* (2013.01); *G06F 3/0412* (2013.01); *G06F 2203/04103* (2013.01); *G06F 2203/04111* (2013.01)

(56) References Cited

FOREIGN PATENT DOCUMENTS

| | | |
|---|---|---|
| CN | 102830555 A | 12/2012 |
| CN | 103123557 A | 5/2013 |
| CN | 203054407 U | 7/2013 |
| CN | 103309094 A | 9/2013 |
| CN | 203241674 U | 10/2013 |
| CN | 103529584 A | 1/2014 |
| CN | 103698926 A | 4/2014 |
| CN | 203606600 U | 5/2014 |
| TW | 201303422 A | 1/2013 |

OTHER PUBLICATIONS

International Search Report and Written Opinion in PCT International Application No. PCT/CN2014/077981, dated Sep. 29, 2014.

* cited by examiner

DISPLAY DEVICE AND METHOD FOR PREPARING THE SAME

CROSS-REFERENCE TO RELATED APPLICATION

This application is the U.S. national phase of PCT Application No. PCT/CN2014/077981 filed on May 21, 2014, which claims a priority of the Chinese Patent Application No. 201310750611.3 filed on Dec. 31, 2013, the disclosures of which are incorporated in their entirety by reference herein.

TECHNICAL FIELD

The present disclosure relates to the field of display technologies, and in particular, to a display device and a method for preparing the same.

BACKGROUND

With the rapid development of display technologies, capacitive touch-screen displays have become gradually popularized in the people's daily lives due to the advantages such as being easy to use, rapid response, space-saving and a good user experience. At the same time, as an up-to-date, frontier advanced technology in the image industry, a naked-eye 3D display technology overcomes the visual fatigue brought to the people by traditional plane images and attracts the people's attentions with strong visual impact.

In the current market, for the commonest touch-screen display, its display and capacitive touch screen are manufactured separately and are subsequently assembled by adhering. However, the processes are complex, and the thickness of the touch-screen display is large. Moreover, in the existing 3D display technology, 3D display is usually realized by setting a parallax baffle (i.e., a slit grating) on a display side of a display panel. For a traditional naked-eye 3D display, 4 glass substrates are required, and there also exists the problem of complex process and large thickness.

In order to improve the market competition, manufactures gradually shift their sight to a display device including both a touch function and a 3D display function. However, if the separate capacitive touch screen and parallax baffle are both assembled with the display by adhering, the thickness of the display will be very large, and the processes will be very complex too, and as a result, it is adverse to lightening and thinning the display device as well reducing the cost thereof.

SUMMARY

The present disclosure provides a display device and a method for preparing the same, so as to solve the problems that a thickness of the display device is very large and processes are very complex when the display device that including both a touch function and a 3D display function is realized by assembling a separate capacitive touch screen and a separate parallax barrier with a display in an adhesive manner.

In one aspect, the present disclosure provides a display device, including:
 a display panel;
 a 3D grating configured to realize 3D display; and
 a touch detection unit configured to realize touch detection;
 wherein the 3D grating includes a base substrate arranged opposite to a display side of the display panel; and a grating structure of the 3D grating and the touch detection unit are both provided between the base substrate and the display panel.

In another aspect, the present disclosure further provides a method for preparing the above display device, including steps of preparing a display panel, a 3D grating and a touch detection unit, wherein the 3D grating includes a base substrate arranged opposite to a display side of the display panel. The step of preparing the 3D grating and the touch detection unit includes forming a grating structure of the 3D grating and the touch detection unit between the base substrate and the display panel.

The above technical solutions of the disclosure have the following beneficial effects:

In the above technical solutions, the 3D grating includes the base substrate arranged opposite to the display side of the display panel, and the grating structure of the 3D grating and the touch detection unit are formed between the base substrate and the display panel. The 3D grating is configured to realize 3D display, and the touch detection unit is configured to realize touch detection. Because the display device that includes both the touch detection function and the 3D display function can be realized merely by providing one base substrate, the thickness of the display device can be decreased, and the demand for lightening and thinning the display device as well as reducing the cost thereof can be met. At the same time, the touch detection unit can be formed in the 3D grating, so it is merely required to adhere the base substrate with the display panel. As a result, the process steps can be reduced, and the product yield can be greatly improved.

BRIEF DESCRIPTION OF THE DRAWINGS

In order to more clearly illustrate the technical solutions of the present disclosure or the related art, the drawings desired for the present disclosure or the related art will be briefly described below. Apparently, the following drawings merely relate to some embodiments of the present disclosure, and other drawings may also be obtained by a person skilled in the art based on these drawings without any creative work.

DETAILED DESCRIPTION

Hereinafter, the present disclosure will be described in details in conjunction with the drawings and the embodiments. The embodiments below are for illustrative purposes only, but shall not be used to limit the scope of the present disclosure.

Embodiment 1

Figure 1:
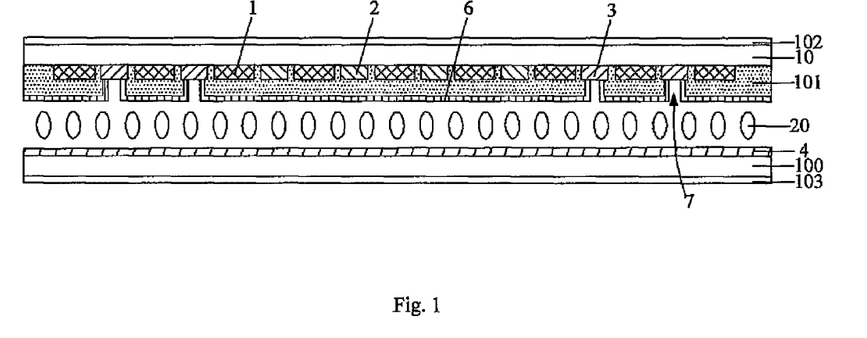
FIG. 1 is a schematic view showing a display device according to one embodiment of the present disclosure.
Figure 2:
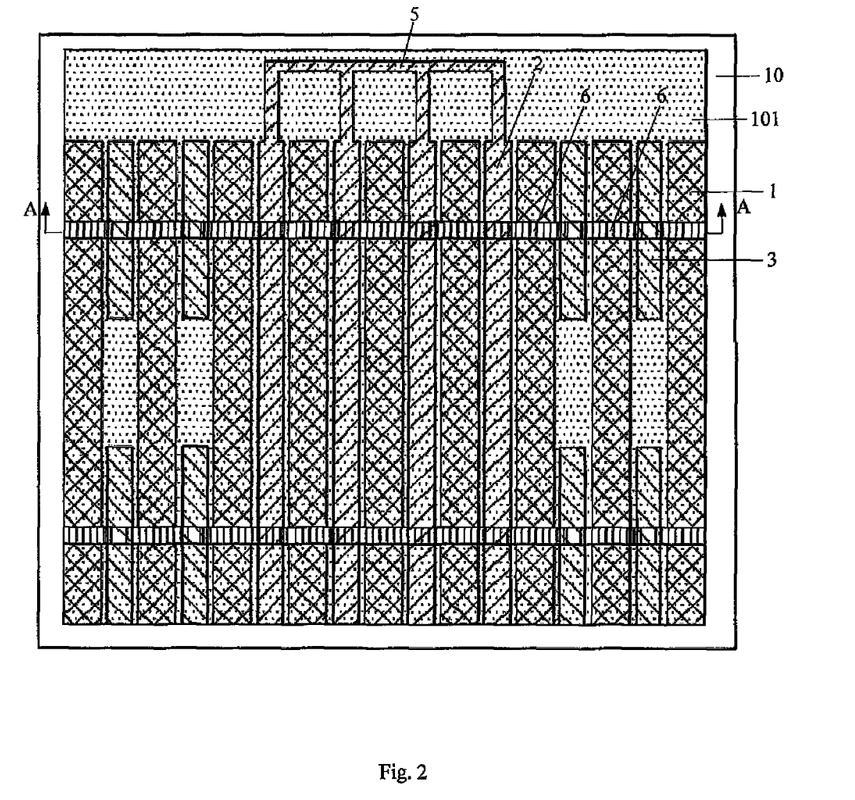
FIG. 2 is a schematic view showing patterns on a base substrate according to one embodiment of the present disclosure.
Figure 5:
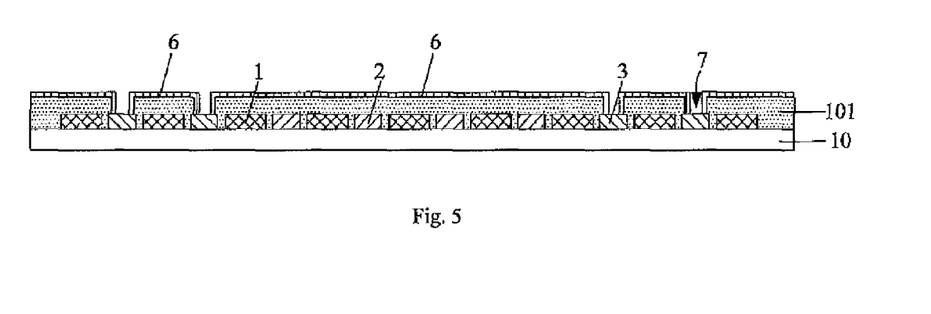
FIG. 5 is a sectional view taken along direction A-A.

The disclosure provides in this embodiment a display device that includes both a touch detection function and a 3D display function. As shown in FIGS. 1, 2 and 5, the display device includes a display panel 100, a 3D grating and a touch detection unit. The display panel 100 is configured to display an image, the 3D grating is configured to realize 3D display, and the touch detection unit is configured to realize touch detection.

The 3D grating includes a base substrate 10 arranged opposite to a display side of the display panel 100. A grating structure of the 3D grating and the touch detection unit are both provided between the base substrate 10 and the display panel 100. Because the display device that includes both the touch detection function and the 3D display function can be realized merely by providing one base substrate 10, the thickness of the display device can be decreased, and the demand for lightening and thinning the display device as well as reducing the cost thereof can be met. At the same time, a touch detection unit can be formed in a 3D grating, so it is merely required to adhere the base substrate 10 with the display panel 100. As a result, the process steps can be reduced, and the product yield can be greatly improved.

In order not to influence the normal display of the display device, it requires that the base substrate 10 be a substrate with a high light transmittance, for example, a glass substrate, a quartz substrate or an organic resin substrate.

In the technical solution of the present disclosure, the 3D grating includes the base substrate arranged opposite to the display side of the display panel, and the grating structure of the 3D grating and the touch detection unit are formed between the base substrate and the display panel. The 3D grating is configured to realize 3D display, and the touch detection unit is configured to realize touch detection. Because the display device that includes both the touch detection function and the 3D display function can be realized merely by providing one base substrate, the thickness of the display device can be decreased, and the demand for lightening and thinning the display device as well as reducing the cost thereof can be met. At the same time, the touch detection unit can be formed in the 3D grating by merely adhering the base substrate with the display panel, and as a result, the process steps can be reduced, and the product yield can be greatly improved.

For a naked-eye 3D display technology in 3D display technologies, because no 3D spectacles are needed, the popularization of the 3D display technology can be realized more easily. At present, the implementation methods of the common naked-eye 3D display device include a slit grating method (i.e., parallax baffle method) and a lens grating method. For the most basic implementation method of the naked-eye 3D display, an image is divided into both a left-eye image and a right-eye image, and then the images are presented to a plurality of left visual zones and right visual zones that are spaced apart from each other by means of the slit grating or the lens grating. When a left eye of a user is located at the left visual zone and the right eye is located at the right visual zone, the left eye of the user can see the corresponding left-eye image, the right eye can see the corresponding right-eye image, and then the brain of the user may combine the left-eye image and the right-eye image into a 3D image, thereby the 3D display may be realized.

For a slit grating, its grating structure includes light-tight grating plates and slits formed between the grating plates. For a lens grating, its grating structure includes a plurality of lenses. Between them, the slit grating has been widely used in the naked-eye 3D display technology due to its simple process and low technical difficulty.

Due to demand from the market, there currently appears a display device capable of switching between a 2D display mode and a 3D display mode. In order to switch between the 2D display mode and the 3D display mode, a liquid crystal shutter slit grating is often employed, which can realize not only the 2D display but also the naked-eye 3D display. The liquid crystal shutter slit grating is a TN-mode liquid crystal panel, and it includes, from top to bottom, an upper polarizer, an upper substrate and a lower substrate that are oppositely arranged to form a cell, a lower polarizer, and a liquid crystal layer filled between the upper substrate and the lower substrate. Among them, the polarization direction of the upper polarizer is the same as that of the lower polarizer. A plurality of parallel strip electrodes is formed at the surface of the upper substrate adjacent to the liquid crystal layer, and the distance between adjacent strip electrodes meets the slit grating condition for the naked-eye 3D display. A plate electrode is formed at the surface of the lower substrate adjacent to the liquid crystal layer. The strip electrode and the plate electrode are electrically connected with two ends of a power supply respectively, and a switch is provided to control the voltage applied to the strip electrodes and the plate electrode. The specific operational principle is as follows. When the switch is turned off, no voltage is applied to the strip electrodes and the plate electrode, and liquid crystal molecules are not deflected, i.e., a light beam will still form an area light source after passing through the liquid crystal shutter slit grating, thereby the 2D display will be realized. When the switch is turned on, a voltage is applied to the strip electrodes and the plate electrode, and liquid crystal molecules located at regions corresponding to the locations of the strip electrodes are deflected, thus no light beam can pass therethrough, and instead, the light beams can only pass through the slits between the strip electrodes, thereby 3D display will be realized.

In this embodiment, the 3D grating is just a liquid crystal shutter slit grating. As shown in FIG. 1, the base substrate 10 and the display panel 100 are oppositely arranged to form a cell, and a space is formed therebetween, in which the liquid crystal layer 20 is filled. Moreover, a plurality of parallel strip electrodes 1 is formed at the surface of the base substrate 10 adjacent to the display panel 100, and pixel units spaced apart on the display panel 100 have a one-to-one correspondence with the strip electrodes 1, thus a width of the slits between the strip electrodes 1 is equal to a width of one pixel unit on the display panel 100, which meets the slit grating condition for the naked-eye 3D display. A plate electrode 4 is provided at the surface of the display panel 100 adjacent to the base substrate 10. The specific operational principle thereof is the same as that described above, and thus will not be repeated herein.

When the touch detection unit is a capacitive touch detection unit, it includes a plurality of driving electrodes distributed in columns and a plurality of sensing electrodes distributed in rows, and a detection capacitor matrix is formed at junctions of the driving electrodes and the sensing electrodes, thus touch detection may be realized by detecting a signal change of the capacitor matrix. In the embodiment, the driving electrodes and the sensing electrodes of the touch detection unit and the strip electrodes 1 of the 3D grating are formed by a same first transparent conductive film, thus the number of patterning processes and the cost may be reduced Specifically, the driving electrodes and the sensing electrodes are formed in the slits between the strip electrodes 1.

Further, because the precision of touch detection is low and the driving electrodes and sensing electrodes generally cover, in a width direction, a plurality of pixel units, as shown in FIG. 2, the driving electrode consists of a plurality of first slit electrode strips 2 that are formed in the slits and electrically connected to each other, and the sensing electrode consists of a plurality of second slit electrode strips 3 that are formed in the slits and electrically connected to each other.

In a preferred embodiment, the first slit electrode strips 2 constituting the driving electrode are electrically connected to each other via bridges, and so do the second slit electrode strips 3 constituting the sensing electrode. Specifically, a second transparent conductive film is formed at the surface of the base substrate 10 adjacent to the display panel 100, and an insulating layer 101 is formed between the first transparent conductive film and the second transparent conductive film. The insulating layer 101 has a plurality of windows 7, e.g., four in FIG. 1, but the present disclosure is not limited thereto. When the strip electrodes 1 extend along a column direction, i.e., they are arranged parallel to the driving electrodes, the plurality of second slit electrode strips 3 constituting the sensing electrodes is distributed in the same row. As shown in FIG. 2, the first transparent conductive film is further configured to form a plurality of first bridges 5, which are located at a non-display region of the display panel and configured to electrically connect the first slit electrode strips 2 constituting the driving electrodes. As shown in FIG. 5, the second transparent conductive film is configured to form a plurality of second bridges 6, which are located at a display region of the display panel, and the two ends of which correspond to two adjacent second slit electrode strips 3 in the row direction, respectively. The second slit electrode strips 3 constituting the sensing electrodes are electrically connected with each other by the second bridges 6 through the corresponding windows 7.

Because the strip electrodes 1 of the liquid crystal shutter slit grating and the driving electrodes and the sensing electrodes of the touch detection unit are formed by the same transparent conducting film layer, during the practical application, in order not to influence the normal touch detection, the strip electrodes 1 need to be set as grounded. The display mode of the display device can be switched by only switching the voltage applied to the plate electrode 4.

Further, in order to realize the display device capable of being switched between the 2D display mode and the 3D display mode, a control device further needs to be provided, so as to switch the voltage applied to the plate electrode 4 and to apply a ground signal to the strip electrodes 1. Specifically, in the 2D display mode, the ground signal is applied to the plate electrode 4, so a region corresponding to the pixel units of the display panel 100 is light-transmissive, while in the 3D display mode, a high-level signal is applied to the plate electrode 4, so a region where the strip electrodes 1 are located is light-tight, but a region where the slits between the strip electrodes 1 are located is light-transmissive.

However, the strip electrodes 1 of the liquid crystal shutter slit grating may also be formed by different films from the driving electrodes and the sensing electrodes of the touch detection unit, and the driving electrode and the sensing electrode may be located at a side of the strip electrodes 1 away from the display panel 100 so as not to influence the touch detection.

When the display device is a liquid crystal display device, as shown in FIG. 1, it includes, from top to bottom, an upper polarizer 102, the display panel 100 and a lower polarizer 103, wherein the upper polarizer 102 is located at the display side of the display panel 100. In this embodiment, the base substrate 10 is located between the display panel 100 and the upper polarizer 102, so that the liquid crystal shutter slit grating may share a group of upper polarizer 102 and lower polarizer 103 with the display panel 100, so as to further reduce the thickness of the display device.

It should be noted that, although the liquid crystal shutter slit grating and the capacitive touch detection unit are employed in this embodiment, the 3D grating of the present disclosure is not limited to the liquid crystal shutter slit grating, and the touch detection unit is not limited to the capacitive touch detection unit. For a person skilled in the art, the touch detection unit may, e.g., be formed in the 3D grating according to the other preparation process and the structures of 3D gratings without any creative work, which also fall within the scope of the present disclosure.

Embodiment 2

Based on the same inventive concept, the disclosure provides in this embodiment a method for preparing the display device of Embodiment 1, which includes steps of preparing a display panel, a 3D grating and a touch detection unit. The display panel is configured to display an image, the 3D grating is configured to realize 3D display, and the touch detection unit is configured to realize touch detection. For the image display, the 3D display and the touch detection, very mature technologies have been developed in the related art, and they will not repeated herein; instead, only inventive points of the present disclosure different from the related art will be described here in details.

The 3D grating includes a base substrate arranged at the display side of the display panel. In this embodiment, the step of preparing a 3D grating and a touch detection unit includes forming a grating structure of the 3D grating and the touch detection unit between the base substrate and the display panel.

The base substrate may be any substrate with a high light transmittance, for example, a glass substrate, a quartz substrate or an organic resin substrate.

In the technical solution of the present disclosure, the 3D grating includes a base substrate, wherein the base substrate is arranged opposite to the display side of the display panel, and a grating structure of the 3D grating and the touch detection unit are formed between the base substrate and the display panel; and the slit grating is configured to realize 3D display, and the touch detection unit is configured to realize touch detection. Because the display device including both the touch detection function and the 3D display function can be realized by only adding a base substrate, the thickness of the display device can be decreased, and the demand for lightening and thinning the display device as well as reducing the cost thereof can be met. At the same time, the touch detection unit can be formed in the 3D grating by only adhering the base substrate with the display panel, thereby the process steps can be reduced, and the product yield can be greatly improved.

For the liquid crystal shutter slit grating, the step of forming the grating structure between the base substrate and the display panel includes:

forming a first transparent conductive film on the base substrate;

patterning the first transparent conductive film to form patterns of a plurality of parallel strip electrodes, wherein, the pixel units spaced apart on the display panel have a one-to-one correspondence with the strip electrodes;

forming a plate electrode at a surface of the display panel adjacent to the base substrate;

arranging oppositely the base substrate and the display panel to form a cell; and filling a liquid crystal layer between the base substrate and the display panel.

The material of the first transparent conductive film may be, for example, tin indium oxide or zinc indium oxide.

Because the pixel units spaced apart on the display panel have a one-to-one correspondence with the strip electrodes, the width of the slit between the strip electrodes is equal to the width of one pixel unit on the display panel, which meets the slit grating condition for the naked-eye 3D display, thereby 3D display can be realized.

By controlling the voltage applied to the strip electrodes and the plate electrode, the display device capable of being switched between the 2D and 3D display modes may be realized. Specifically, in 2D display, no voltage is applied to the strip electrodes and the plate electrode, and the liquid crystal molecules between the base substrate and the display panel are not deflected, thus a light beam will still form an area light source after passing through the liquid crystal shutter slit grating; while in 3D display, a voltage is applied to the strip electrodes and the plate electrode, and the liquid crystal molecules located at regions corresponding to the locations of the strip electrodes are deflected, thus no light beam can pass through these locations but the light beam can only pass through the slits between the strip electrodes, thereby 3D display can be realized.

Further, when the touch detection unit is a capacitive touch detection unit, the first transparent conductive film is patterned so as to form patterns of a plurality of driving electrodes distributed in columns and a plurality of sensing electrodes distributed in rows, that is, the strip electrodes of the 3D grating and the driving electrodes and the sensing electrodes are formed by the same first transparent conductive film. As a result, the number of patterning processes and the cost will be reduced. Specifically, the driving electrodes and the sensing electrodes are formed in the slits between the strip electrodes.

Because the precision of touch detection is low and the driving electrodes and sensing electrodes generally cover, in a width direction, a plurality of pixel units, the driving electrode consists of a plurality of first slit electrode strips 2 that are formed in the slits and electrically connected to each other, and the sensing electrode consists of a plurality of second slit electrode strips 3 that are formed in the slits and electrically connected to each other.

In a preferred embodiment, the first slit electrode strips constituting the driving electrodes are electrically connected to each other via bridges, and so do the second slit electrode strips constituting the sensing electrodes.

Specifically, the strip electrodes extend along the column direction; and the plurality of second slit electrode strips constituting the sensing electrodes are distributed in a same row.

The first transparent conductive film is further patterned so as to form a plurality of first bridges located at a non-display region to electrically connect the plurality of first slit electrode strips constituting the driving electrodes.

The preparation method further includes:

forming a second transparent conductive film on the base substrate, and patterning the second transparent conductive film to form a plurality of second bridges; and forming an insulating layer between the first transparent conductive film and the second transparent conductive film, and patterning the insulating layer to form a plurality of windows;

wherein, the second bridges are located at a display region, the two ends thereof correspond to adjacent two second slit electrode strips in the row direction, and the second slit electrode strips constituting the sensing electrodes are electrically connected to each other by the second bridges through the corresponding windows.

By the first bridges and the second bridges formed in the above steps, it is able to distribute the driving electrodes and the sensing electrodes in a crisscross manner, and form a detection capacitor matrix, thereby to detect a touch.

Because the strip electrodes of the liquid crystal shutter slit grating are formed by the same transparent conductive film as the driving electrodes and the sensing electrodes of the touch detection unit, during the practical application, in order not to influence the normal touch detection, the strip electrodes need to be set as grounded. Therefore, the display mode of the display device can be switched by switching the voltage applied to the plate electrode.

However, the strip electrodes of the liquid crystal shutter slit grating may also be formed by different films from the driving electrodes and the sensing electrodes of the touch detection unit, and the driving electrodes and the sensing electrodes are located at a side of the strip electrodes away from the display panel so as not to influence touch detection.

When the display device is a liquid crystal display device, the liquid crystal display device includes, from top to bottom, an upper polarizer, a display panel and a lower polarizer, wherein the base substrate of the 3D grating is located between the display panel and the upper polarizer. As a result, the liquid crystal shutter slit grating may share a group of upper polarizer and lower polarizer with the display panel, thus the thickness of the display device may be further decreased.

A process of forming a grating structure, a driving electrode and a sensing electrode between the base substrate and the display panel in this embodiment will be described hereinafter by taking the liquid crystal shutter slit grating and the capacitive touch detection unit as an example. The process includes the following steps.

Figure 3:
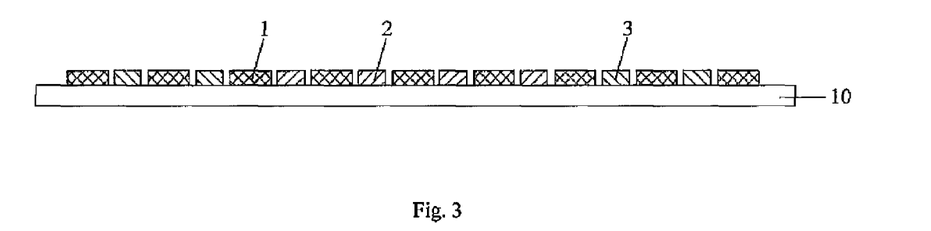
FIG. 3 and FIG. 4 are schematic views showing the procedures of preparing the patterns on the base substrate according to one embodiment of the present disclosure.

Step a: as shown in FIG. 3 and in conjunction with FIG. 2, first of all, the first transparent conductive film is formed on the base substrate 10 via magnetron sputtering, heat evaporation or any other film-forming methods, and a patterning process (which includes coating, exposing, developing, etching and removing a photoresist, etc., and the patterning process below will include the above steps, unless otherwise stated) is performed on the first transparent conductive film to form the strip electrodes 1 of the 3D grating, the plurality of first slit electrode strips 2 constituting the driving electrodes of the touch detection unit, the plurality of second slit electrode strips 3 constituting the sensing electrodes of the touch detection unit, and the first bridges 5. The pixel units spaced apart on the display panel have a one-to-one correspondence with the strip electrodes 1. The strip electrodes 1 extend along the column direction, that is, they are arranged parallel to the driving electrodes, and the plurality of second slit electrode strips 3 constituting the sensing electrodes are distributed in a same row. The first bridges 5 are located at a non-display region and configured to connect the plurality of first slit electrode strips 2 constituting the driving electrodes.

Figure 4:
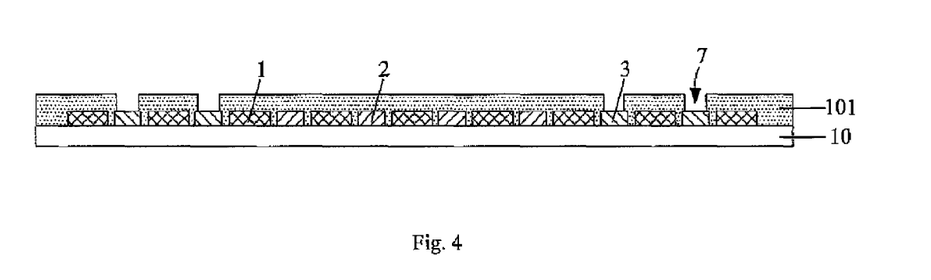

Step b: as shown in FIG. 4, next, the insulating layer 101 is formed, via magnetron sputtering, heat evaporation, PECVD or any other film-forming methods, on the base substrate 10 on which Step a has been accomplished. A material of the insulating layer 101 may be, for example, oxide, nitride or nitroxide; specifically, the insulating layer 101 may be made of SiNx, SiOx or Si(ON)x. The insulating layer 101 may have a single-layer structure or a two-layer structure made of silicon nitride and silicon oxide. Moreover, the insulating layer 101 is patterned to form a plurality of windows 7.

Step c: as shown in FIG. 5, finally, the second transparent conductive film is formed, via magnetron sputtering, heat evaporation, PECVD or any other film-forming methods, on the base substrate 10 on which Step b has been accomplished, and the second transparent conductive film is patterned so as to form the plurality of second bridges 6. As shown in FIG. 2, the second bridges 6 are located at a display region, the two ends thereof correspond to two adjacent second slit electrode strips 3 in the row direction, and the plurality of second slit electrode strips 3 constituting the sensing electrodes are electrically connected to each other by the second bridges 6 through the corresponding insulating layer windows 7.

Through the above Steps a-c, the liquid crystal shutter slit grating, and the driving electrodes and the sensing electrodes of the touch detection unit may be manufactured. The strip electrodes of the liquid crystal shutter slit grating and the driving electrodes and the sensing electrodes of the touch detection unit may be formed simultaneously by patterning the same transparent conductive film. As a result, it is able to reduce the number of patterning processes and the cost.

The above are merely the preferred embodiments of the present disclosure. It should be noted that, a person skilled in the art may make further modifications and substitutions without departing from the principle of the present disclosure, and these modifications and substitutions shall also fall within the scope of the present disclosure.

What is claimed is:

1. A display device, comprising:
a display panel;
a 3D grating configured to realize 3D display; and
a touch detection unit configured to realize touch detection, wherein
the 3D grating comprises a base substrate arranged opposite to a display side of the display panel; and
a grating structure of the 3D grating and the touch detection unit are both provided between the base substrate and the display panel,
wherein the 3D grating is a liquid crystal shutter slit grating;
the base substrate and the display panel are oppositely arranged to form a cell;
the 3D grating further comprises:
a liquid crystal layer filled between the base substrate and the display panel,
a plurality of parallel strip electrodes formed on the base substrate and having a one-to-one correspondence with pixel units spaced apart on the display panel; and
a plate electrode formed at a surface of the display panel adjacent to the base substrate;
wherein, the strip electrodes extend along the column direction;
the display device further comprises an insulating layer, a plurality of first bridges and a plurality of second bridges;
the insulating layer has a plurality of windows located between the first transparent conductive film and a second transparent conductive film;
the first bridges are located at a non-display region of the display panel and formed by the first transparent conductive film, and electrically connect a plurality of first slit electrode strips constituting the driving electrodes; and
the second bridges are located at a display region of the display panel and formed by the second transparent conductive film; two ends of the second bridges correspond to two adjacent second slit electrode strips in a row direction, respectively, and a plurality of second slit electrode strips constituting the sensing electrodes is electrically connect to each other by the second bridges through the corresponding windows in the insulating layer.

2. The display device according to claim 1, wherein the touch detection unit comprises a plurality of driving electrodes distributed in columns and a plurality of sensing electrodes distributed in rows;
the strip electrodes, the driving electrodes and the sensing electrodes are formed by a same first transparent conductive film, and the driving electrodes and the sensing electrodes are formed in slits between the strip electrodes; and
the driving electrodes consist of a plurality of first slit electrode strips that are formed in the slits and electrically connected to each other; and the sensing electrodes consist of a plurality of second slit electrode strips that are formed in the slits and electrically connected to each other.

3. The display device according to claim 2, wherein, the strip electrodes extend along the column direction;
the insulating layer has a plurality of windows located between the first transparent conductive film and a second transparent conductive film;
the first bridges are located at a non-display region of the display panel and formed by the first transparent conductive film, and electrically connect a plurality of first slit electrode strips constituting the driving electrodes; and
the second bridges are located at a display region of the display panel and formed by the second transparent conductive film; two ends of the second bridges correspond to two adjacent second slit electrode strips in a row direction, respectively, and a plurality of second slit electrode strips constituting the sensing electrodes is electrically connect to each other by the second bridges through the corresponding windows in the insulating layer.

4. The display device according to claim 1, wherein, the display device is a liquid crystal display device;
the liquid crystal display device comprises, from top to bottom, an upper polarizer, a display panel and a lower polarizer, and the upper sheet polarizer is located opposite to a display side of the display panel; and
the base substrate is located between the display panel and the upper polarizer.

5. The display device according to claim 2, wherein, the display device is a liquid crystal display device;
the liquid crystal display device comprises, from top to bottom, an upper polarizer, a display panel and a lower polarizer, and the upper sheet polarizer is located opposite to a display side of the display panel; and
the base substrate is located between the display panel and the upper polarizer.

6. The display device according to claim 3, wherein, the display device is a liquid crystal display device;
the liquid crystal display device comprises, from top to bottom, an upper polarizer, a display panel and a lower polarizer, and the upper sheet polarizer is located opposite to a display side of the display panel; and
the base substrate is located between the display panel and the upper polarizer.

7. The display device according to claim 1, wherein the display device further comprises a control device configured to switch a voltage applied to the plate electrode and to apply a ground signal to the strip electrodes;
- the ground signal is applied to the plate electrode in a 2D display mode, and a region corresponding to the pixel units of the display panel is light-transmissive; and
- a high-level signal is applied to the plate electrode in a 3D display mode, a region where the strip electrodes are located is light-tight, and a region where the slits between the strip electrodes are located is light-transmissive.

8. The display device according to claim 2, wherein, the display device further comprises a control device, configured to switch a voltage applied to the plate electrode and to apply a ground signal to the strip electrodes;
- the ground signal is applied to the plate electrode in a 2D display mode, and a region corresponding to the pixel units of the display panel is light-transmissive; and
- a high-level signal is applied to the plate electrode in a 3D display mode, a region where the strip electrodes are located is light-tight, and a region where the slits between the strip electrodes are located is light-transmissive.

9. The display device according to claim 3, wherein, the display device further comprises a control device, configured to switch a voltage applied to the plate electrode and to apply a ground signal to the strip electrodes;
- the ground signal is applied to the plate electrode in a 2D display mode, and a region corresponding to the pixel units of the display panel is light-transmissive; and
- a high-level signal is applied to the plate electrode in a 3D display mode, a region where the strip electrodes are located is light-tight, and a region where the slits between the strip electrodes are located is light-transmissive.

10. A method for preparing the display device according to claim 1, comprising steps of preparing a display panel, a 3D grating and a touch detection unit, wherein the 3D grating comprises a base substrate arranged opposite to a display side of the display panel;
- the step of preparing the 3D grating and the touch detection unit comprises:
- forming a grating structure of the 3D grating and the touch detection unit between the base substrate and the display panel,
- wherein the step of forming the grating structure of the 3D between the base substrate and the display panel comprises:
- forming a first transparent conductive film on the base substrate;
- patterning the first transparent conductive film to form patterns of a plurality of parallel strip electrodes, wherein pixel units spaced apart on the display panel have a one-to-one correspondence with the strip electrodes;
- forming a plate electrode at a surface of the display panel adjacent to the base substrate;
- arranging oppositely the base substrate and the display panel to form a cell; and
- filling a liquid crystal layer between the base substrate and the display panel,
- wherein, the strip electrodes extend along a column direction;
- the first transparent conductive film is patterned to form a plurality of first bridges, and the first bridges are located at a non-display region and electrically connect a plurality of first slit electrode strips constituting the driving electrodes;
- the preparation method further comprises:
- forming a second transparent conductive film on the base substrate, and patterning the second transparent conductive film to form a plurality of second bridges; and
- forming an insulating layer between the first transparent conductive film and the second transparent conductive film, and patterning the insulating layer to form a plurality of windows;
- wherein the second bridges are located at a display region, and two ends thereof correspond to two adjacent second slit electrode strips in a row direction, and a plurality of second slit electrode strips constituting the sensing electrodes is electrically connected to each other by the second bridges through the corresponding windows in the insulating layer.

11. The method according to claim 10, wherein the touch detection unit comprises a plurality of driving electrodes distributed in columns and a plurality of sensing electrodes distributed in rows;
- the first transparent conductive film is patterned to form patterns of the driving electrodes and the sensing electrodes of the touch detection unit;
- wherein the driving electrodes and the sensing electrodes are formed in the slits between the strip electrodes; and
- the driving electrodes consist of a plurality of first slit electrode strips that are formed in the slits and electrically connected to each other; and the sensing electrodes consist of a plurality of second slit electrode strips that are formed in the slits and electrically connected to each other.

12. The method according to claim 11, wherein, the strip electrodes extend along a column direction;
- the first transparent conductive film is patterned to form a plurality of first bridges, and the first bridges are located at a non-display region and electrically connect a plurality of first slit electrode strips constituting the driving electrodes;
- the preparation method further comprises:
- forming a second transparent conductive film on the base substrate, and patterning the second transparent conductive film to form a plurality of second bridges; and
- forming an insulating layer between the first transparent conductive film and the second transparent conductive film, and patterning the insulating layer to form a plurality of windows;
- wherein the second bridges are located at a display region, and two ends thereof correspond to two adjacent second slit electrode strips in a row direction, and a plurality of second slit electrode strips constituting the sensing electrodes is electrically connected to each other by the second bridges through the corresponding windows in the insulating layer.

13. The method according to claim 10, wherein the display device is a liquid crystal display device;
- the liquid crystal display device comprises, from top to bottom, an upper polarizer, a display panel and a lower polarizer, and the upper polarizer is located at a display side of display panel; and
- the base substrate is located between the display panel and the upper polarizer.

14. A display device, comprising:
a display panel;
a 3D grating configured to realize 3D display; and a touch detection unit configured to realize touch detection, wherein the 3D grating comprises a base substrate arranged opposite to a display side of the display panel; and a grating structure of the 3D grating and the touch detection unit are both provided between the base substrate and the display panel, wherein the 3D grating is a liquid crystal shutter slit grating;

the base substrate and the display panel are oppositely arranged to form a cell;

the 3D grating further comprises:

a liquid crystal layer filled between the base substrate and the display panel;

a plurality of parallel strip electrodes formed on the base substrate and having a one-to-one correspondence with pixel units spaced apart on the display panel; and a plate electrode formed at a surface of the display panel adjacent to the base substrate, wherein the touch detection unit comprises a plurality of driving electrodes distributed in columns and a plurality of sensing electrodes distributed in rows;

the strip electrodes, the driving electrodes and the sensing electrodes are formed by a same first transparent conductive film, and the driving electrodes and the sensing electrodes are formed in slits between the strip electrodes; and the driving electrodes consist of a plurality of first slit electrode strips that are formed in the slits and electrically connected to each other; and the sensing electrodes consist of a plurality of second slit electrode strips that are formed in the slits and electrically connected to each other.

15. The display device according to claim 14, wherein, the strip electrodes extend along the column direction;

the display device further comprises an insulating layer, a plurality of first bridges and a plurality of second bridges;

the insulating layer has a plurality of windows located between the first transparent conductive film and a second transparent conductive film;

the first bridges are located at a non-display region of the display panel and formed by the first transparent conductive film, and electrically connect a plurality of first slit electrode strips constituting the driving electrodes; and the second bridges are located at a display region of the display panel and formed by the second transparent conductive film; two ends of the second bridges correspond to two adjacent second slit electrode strips in a row direction, respectively, and a plurality of second slit electrode strips constituting the sensing electrodes is electrically connect to each other by the second bridges through the corresponding windows in the insulating layer.

16. The display device according to claim 14, wherein, the display device is a liquid crystal display device;

the liquid crystal display device comprises, from top to bottom, an upper polarizer, a display panel and a lower polarizer, and the upper sheet polarizer is located opposite to a display side of the display panel; and the base substrate is located between the display panel and the upper polarizer.

17. The display device according to claim 15, wherein, the display device is a liquid crystal display device;

the liquid crystal display device comprises, from top to bottom, an upper polarizer, a display panel and a lower polarizer, and the upper sheet polarizer is located opposite to a display side of the display panel; and the base substrate is located between the display panel and the upper polarizer.

18. The display device according to claim 14, wherein the display device further comprises a control device configured to switch a voltage applied to the plate electrode and to apply a ground signal to the strip electrodes;

the ground signal is applied to the plate electrode in a 2D display mode, and a region corresponding to the pixel units of the display panel is light-transmissive; and a high-level signal is applied to the plate electrode in a 3D display mode, a region where the strip electrodes are located is light-tight, and a region where the slits between the strip electrodes are located is light-transmissive.

19. The display device according to claim 15, wherein, the display device further comprises a control device, configured to switch a voltage applied to the plate electrode and to apply a ground signal to the strip electrodes;

the ground signal is applied to the plate electrode in a 2D display mode, and a region corresponding to the pixel units of the display panel is light-transmissive; and a high-level signal is applied to the plate electrode in a 3D display mode, a region where the strip electrodes are located is light-tight, and a region where the slits between the strip electrodes are located is light-transmissive.

20. A method for preparing the display device according to claim 14, comprising steps of preparing a display panel, a 3D grating and a touch detection unit, wherein the 3D grating comprises a base substrate arranged opposite to a display side of the display panel;

the step of preparing the 3D grating and the touch detection unit comprises:

forming a grating structure of the 3D grating and the touch detection unit between the base substrate and the display panel, wherein the step of forming the grating structure of the 3D between the base substrate and the display panel comprises:

forming a first transparent conductive film on the base substrate;

patterning the first transparent conductive film to form patterns of a plurality of parallel strip electrodes, wherein pixel units spaced apart on the display panel have a one-to-one correspondence with the strip electrodes;

forming a plate electrode at a surface of the display panel adjacent to the base substrate;

arranging oppositely the base substrate and the display panel to form a cell; and filling a liquid crystal layer between the base substrate and the display panel, wherein the touch detection unit comprises a plurality of driving electrodes distributed in columns and a plurality of sensing electrodes distributed in rows;

the first transparent conductive film is patterned to form patterns of the driving electrodes and the sensing electrodes of the touch detection unit;

wherein the driving electrodes and the sensing electrodes are formed in the slits between the strip electrodes; and the driving electrodes consist of a plurality of first slit electrode strips that are formed in the slits and electrically connected to each other; and the sensing electrodes consist of a plurality of second slit electrode strips that are formed in the slits and electrically connected to each other.

* * * * *